C. S. NEVILLE.

SIGN.

APPLICATION FILED MAY 9, 1910.

Reissued Jan. 3, 1911.

13,189.

Witnesses:
Milton Lenoir
Jas. S. Young

Inventor
Christie S. Neville.
By Gillson & Gillson
Attorneys

THE NORRIS PETERS CO., WASHINGTON, D. C.

UNITED STATES PATENT OFFICE.

CHRISTIE S. NEVILLE, OF CHICAGO, ILLINOIS.

SIGN.

13,189. Specification of Reissued Letters Patent. Reissued Jan. 3, 1911.

Original No. 914,064, dated March 2, 1909, Serial No. 457,016. Application for reissue filed May 9, 1910. Serial No. 560,383.

*To all whom it may concern:*

Be it known that I, CHRISTIE S. NEVILLE, a citizen of the United States of America, and resident of Chicago, county of Cook, and State of Illinois, have invented certain new and useful Improvements in Signs, of which the following is a specification, and which are illustrated in the accompanying drawings, forming a part thereof.

The invention relates to signs especially adapted to be placed in front of stores. Its object is to provide a neat and conspicuous sign with improved means for illuminating its face.

The invention is hereinafter described, and is illustrated in the accompanying drawings, in which—

Figure 2:
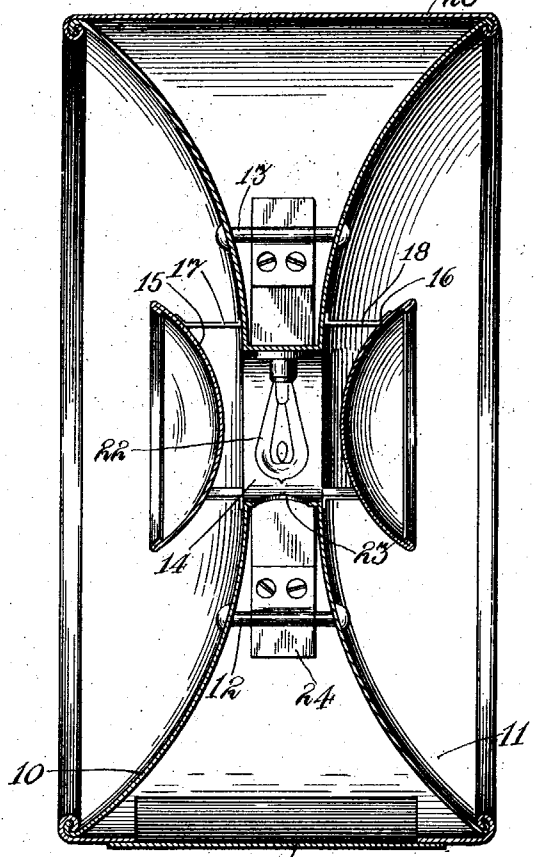
Figure 1:
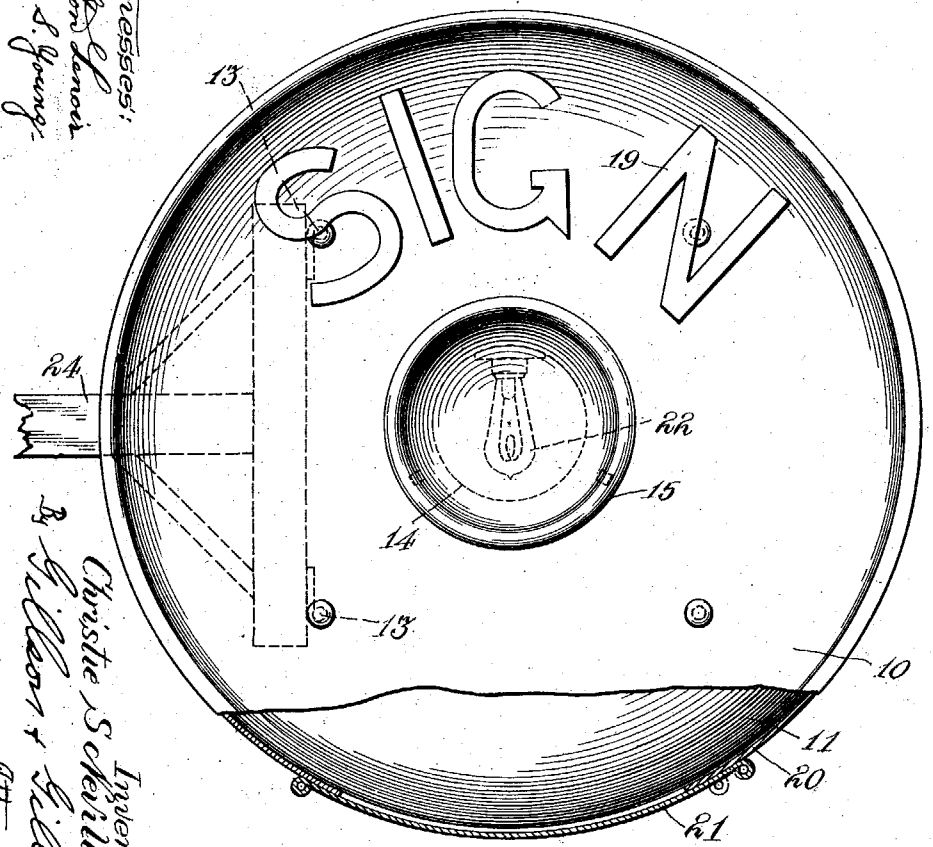

Figure 1 is a front elevation of the sign; and Fig 2 is a vertical central section thereof.

The sign, as illustrated, comprises a pair of concave disks 10, 11, suitably and rigidly secured together, as by means of stay bolts, 12, 13. The concave faces of these disks are outwardly directed, and they are spaced apart and connected by a central tubular member 14, which forms a chamber for a lamp, this chamber opening through both of the disks. In front of each of the central apertures forming the openings of this chamber there is placed a reflector 15, 16, suitably supported from the adjacent disks, as by means of bracket arms 17, 18. These reflectors may be of glass or metal. As shown they are of the latter material, and they are so shaped as to reflect the light upon the face of the disk, thereby illuminating its entire surface. The sign characters, as 19, are placed upon the faces of the disks in any preferred manner.

Preferably a casing 20 is applied to the outer edges of the disks to inclose the space between them for the purpose of excluding the weather and adding to the neatness of the appearance of the sign. When this casing is employed it is provided with a suitable door, as 21, to permit access to the lamp.

There is shown an incandescent electric lamp 22, carried by a suitable socket which will be supplied with current through wires properly connected. The tube 14 has a lateral aperture 23 for giving access to the lamp. It will be understood that any preferred type of lamp may be employed, whether electrical or otherwise.

As shown, the sign may be supported by means of a bracket-arm 24 projecting from any suitable support, as the front of a store building. If desired one of the disks 10 or 11 may be omitted, in which case the remaining disk will be faced outwardly from the supporting structure.

I claim as my invention:—

1. In a sign, in combination, a centrally apertured disk for carrying upon its face the sign characters, a source of light located back of the central aperture of the disk, and a reflector located forward of the disk in line with its aperture and arranged to reflect the light rays upon the surface of the disk.

2. In a sign, in combination, a centrally-apertured concave disk for carrying upon its face the sign characters, a source of light located back of the central aperture of the disk, and a reflector located forward of the disk and in line with its aperture and arranged to reflect the light rays upon the surface of the disk.

3. In a sign, in combination, a pair of outwardly-facing centrally-apertured concave disks, a lamp located between the disks and in line with their apertures, a reflector located centrally in front of each disk and arranged to reflect light rays from the lamp upon the disk surface.

4. In a sign, in combination, a pair of outwardly-directed centrally-apertured concave disks, a tube connecting the two disks and surrounding their central apertures, a lamp located within the tube, a reflector opposite each end of the tube and in front of the disk and arranged to reflect light rays from the lamp upon the disk face.

5. In a sign, in combination, an apertured plate for carrying upon its surface the sign characters, a source of light located back of the aperture of the plate, a reflector located forward of the plate in line with its aperture and arranged to cover the source of light and reflect the light rays upon the surface of the plate.

6. In a sign, in combination, a pair of concave plates placed back to back and having registering apertures at the place of their nearest approach, a lamp located upon the median plane between the plates in line with the apertures, and a reflector located in front of each plate to cover the aperture in the said plate and reflect light from the lamp onto the surface of the plate.

CHRISTIE S. NEVILLE.

Witnesses:

CHARLES B. GILLSON,
E. M. KLATCHER.